US012249289B2

(12) United States Patent
Akiba

(10) Patent No.: US 12,249,289 B2
(45) Date of Patent: Mar. 11, 2025

(54) CIRCUIT DEVICE AND DISPLAY SYSTEM

(71) Applicant: SEIKO EPSON CORPORATION, Tokyo (JP)

(72) Inventor: Yasutoshi Akiba, Chino (JP)

(73) Assignee: SEIKO EPSON CORPORATION (JP)

(*) Notice: Subject to any disclaimer, the term of this patent is extended or adjusted under 35 U.S.C. 154(b) by 55 days.

(21) Appl. No.: 18/160,685

(22) Filed: Jan. 27, 2023

(65) Prior Publication Data

US 2023/0245627 A1 Aug. 3, 2023

(30) Foreign Application Priority Data

Jan. 28, 2022 (JP) ................................ 2022-011512

(51) Int. Cl.
*G09G 3/34* (2006.01)

(52) U.S. Cl.
CPC ... *G09G 3/3406* (2013.01); *G09G 2320/0233* (2013.01); *G09G 2320/0242* (2013.01); *G09G 2320/0626* (2013.01); *G09G 2360/16* (2013.01)

(58) Field of Classification Search
CPC ......... G09G 3/3406; G09G 2320/0233; G09G 2320/0242; G09G 2320/0626; G09G 2360/16
See application file for complete search history.

(56) References Cited

U.S. PATENT DOCUMENTS

| | | | | |
|---|---|---|---|---|
| 2013/0176326 | A1* | 7/2013 | Safaee-Rad | H04N 21/4318 345/590 |
| 2015/0116545 | A1* | 4/2015 | Ovsiannikov | H04N 25/134 348/239 |
| 2015/0243250 | A1 | 8/2015 | Fukuda | |
| 2019/0266711 | A1 | 8/2019 | Anand et al. | |
| 2020/0198468 | A1 | 6/2020 | Anand et al. | |
| 2020/0201035 | A1 | 6/2020 | Anand et al. | |
| 2021/0193066 | A1 | 6/2021 | Anand et al. | |
| 2023/0154434 | A1* | 5/2023 | Lee | G09G 5/06 345/589 |
| 2023/0186438 | A1* | 6/2023 | Wagenaar | G02B 27/0172 345/647 |

FOREIGN PATENT DOCUMENTS

| | | |
|---|---|---|
| JP | 2001-117071 A | 4/2001 |
| JP | 2015-158636 A | 9/2015 |
| JP | 2018-090170 A | 6/2018 |
| JP | 2019-149760 A | 9/2019 |
| JP | 2020-100388 A | 7/2020 |
| JP | 2020-101784 A | 7/2020 |
| JP | 2021-101199 A | 7/2021 |

* cited by examiner

*Primary Examiner* — Kenneth B Lee, Jr.
(74) *Attorney, Agent, or Firm* — Harness, Dickey & Pierce, P.L.C.

(57) ABSTRACT

A circuit device includes: a color correction circuit configured to perform color correction on image data to output display image data to a display device; a reverse color correction circuit configured to perform reverse color correction of the color correction on the display image data to output image data after being subjected to the reverse color correction; and a comparison circuit configured to compare the image data with the image data after being subjected to the reverse color correction to output a result of the comparison as error detection information of the display image data.

11 Claims, 11 Drawing Sheets

CIRCUIT DEVICE AND DISPLAY SYSTEM

The present application is based on, and claims priority from JP Application Serial Number 2022-011512, filed Jan. 28, 2022, the disclosure of which is hereby incorporated by reference herein in its entirety.

BACKGROUND

1. Technical Field

The present disclosure relates to a circuit device, a display system, and the like.

2. Related Art

In a display device, color correction may be performed on image data, and display image data after being subjected to the color correction may be displayed. For example, JP-A-2001-117071 discloses a display device for a vehicle that corrects image data to a color tone that cancels a change in color tone when a color tone of a backlight changes.

However, a method for checking whether appropriate color correction is performed on image data has not been proposed so far.

SUMMARY

An aspect of the present disclosure relates to a circuit device including: a color correction circuit configured to perform color correction on image data to output display image data to a display device; a reverse color correction circuit configured to perform reverse color correction of the color correction on the display image data to output image data after being subjected to the reverse color correction; and a comparison circuit configured to compare the image data with the image data after being subjected to the reverse color correction to output a result of the comparison as error detection information of the display image data.

Another aspect of the present disclosure relates to a circuit device including: a distortion correction circuit configured to perform distortion correction of input image data to output image data; a color correction circuit configured to perform color correction on the image data to output display image data to a display device; a reverse color correction circuit configured to perform reverse color correction of the color correction on the display image data to output image data after being subjected to the reverse color correction; a reverse distortion correction circuit configured to perform reverse distortion correction of the distortion correction on the image data after being subjected to the reverse color correction to output image data after being subjected to the reverse distortion correction; and a comparison circuit configured to compare the input image data with the image data after being subjected to the reverse distortion correction to output a result of the comparison as error detection information of the display image data.

Another aspect of the present disclosure relates to a display system including: the circuit device described above; and the display device.

DESCRIPTION OF EXEMPLARY EMBODIMENTS

Hereinafter, a preferred embodiment according to the present disclosure will be described in detail. The present embodiment to be described below does not unduly limit contents described in the claims, and not all configurations described in the present embodiment are necessarily essential constituent elements.

1. Circuit Device

Figure 1:
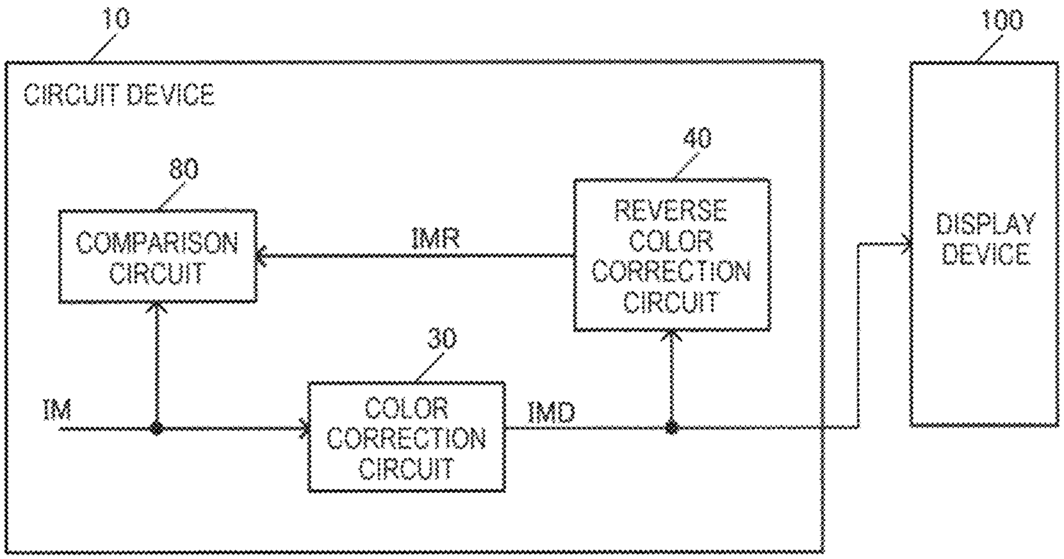
FIG. 1 shows a configuration example of a circuit device according to an embodiment.

FIG. 1 shows a configuration example of a circuit device 10 according to the present embodiment. The circuit device 10 includes a color correction circuit 30, a reverse color correction circuit 40, and a comparison circuit 80.

The circuit device 10 is, for example, an integrated circuit device in which a plurality of circuit elements are integrated on a semiconductor substrate. A display device 100 displays an image based on display image data IMD from the circuit device 10. When a head-up display is taken as an example, the display device 100 is a device for displaying a virtual image in a field of view of a user. The display device 100 includes a display panel, a display driver, or the like. The display device 100 may further include a light source device such as a backlight. In addition, the display device 100 is, for example, a display device used for the head-up display, but may be another display device for an automobile, such as a cluster display which is a display having a meter panel, or may be a display device for an application other than the automobile.

The color correction circuit 30 performs color correction on image data IM and outputs the display image data IMD to the display device 100. That is, the color correction circuit 30 performs the color correction on the image data IM and outputs the image data IM subjected to the color correction to the display device 100 as the display image data IMD. The color correction is, for example, a color adjustment process of the image data IM, and is a correction process of adjusting a color level. The color correction may also be referred to as luminance correction or gradation correction of the image data IM.

For example, when the display image data IMD is displayed on the display device 100 and the dimming control is performed, the color correction circuit 30 performs, on the image data IM, the color correction in accordance with a dimming amount under the dimming control. The dimming control is control for adjusting a light amount of the light source device such as the backlight. The dimming control may be dimming control of local dimming under which brightness of the light source device such as the backlight is controlled for each of a plurality of areas, or may be dimming control under which brightness of an entire display screen is globally controlled. Under the dimming control, in order to reduce power consumption of the light source device and to make black pixels appear blacker, control for decreasing the light amount of the light source of the light source device is performed. In this case, the color correction circuit 30 performs the color correction to increase a luminance of a pixel corresponding to the light source on a display screen of the display device 100 by an amount corresponding to the decrease in light amount of the light source. For example, the color correction circuit 30 performs the color correction on each pixel value of the image data IM, so that the image displayed on the display device 100 based on the display image data IMD has the same brightness and hue as an image of the image data IM, and outputs the image data IM subjected to the color correction to the display device 100 as the display image data IMD. The color correction performed by the color correction circuit 30 is not limited to such color correction for compensating for the dimming control, and may be color correction for adjusting the hue or the like of the image displayed on the display device 100.

The reverse color correction circuit 40 performs reverse color correction. Specifically, the reverse color correction circuit 40 performs the reverse color correction of the color correction on the display image data IMD to output image data IMR after being subjected to the reverse color correction. The reverse color correction is color correction of reversing the color correction performed by the color correction circuit 30, and is reverse conversion of conversion in the color correction. For example, the reverse color correction performed by the reverse color correction circuit 40 is color correction for returning the display image data IMD after being subjected to the color correction to the original image data IM. For example, when the color correction for increasing the luminance of each pixel of the display image data IMD is performed due to the decrease in light amount of the light source under the dimming control, the reverse color correction circuit 40 performs the reverse color correction for decreasing the increased luminance and returning the luminance to the original luminance. Alternatively, the reverse color correction may be correction for returning the changed hue to the original hue when the hue is changed by the color correction. The image data IMR after being subjected to the reverse color correction that is output by the reverse color correction circuit 40 and the original image data IM do not need to completely match each other, and may match each other within a predetermined error range. The error range is a range of a rounding error, or the like. In addition, a resolution of the image data IMR after being subjected to the reverse color correction may not match a resolution of the original image data IM, and for example, the image data IMR after being subjected to the reverse color correction may be image data having a lower resolution.

The comparison circuit 80 compares the image data IM with the image data IMR after being subjected to the reverse color correction. Then, the comparison circuit 80 outputs a comparison result as error detection information of the display image data IMD. The error detection information is information for performing error detection of the display image data IMD. For example, the comparison circuit 80 outputs an error detection signal or error detection data as the error detection information. For example, the comparison circuit 80 may output setting data to a register (not shown) as the error detection information. For example, the comparison circuit 80 compares the image data IM with the image data IMR after being subjected to the reverse color correction to determine degree of coincidence between the image data IM and the image data IMR after being subjected to the reverse color correction. The degree of coincidence can also be referred to as degree of similarity. For example, the comparison circuit 80 outputs the error detection signal when it is determined that the image data IM and the image data IMR after being subjected to the reverse color correction do not match each other. On the other hand, when it is determined that the image data IM and the image data IMR after being subjected to the reverse color correction coincide with each other within a given error range, the comparison circuit 80 does not output the error detection information. Specifically, the comparison circuit 80 obtains an index indicating the degree of coincidence between the image data IM and the image data IMR after being subjected to the reverse color correction. Then, the comparison circuit 80 determines whether the obtained index exceeds a given threshold value, and outputs the error detection information such as the error detection signal or the error detection data when the obtained index exceeds the threshold value. On the other hand, the comparison circuit 80 does not output the error detection information when the index value indicating the degree of coincidence is equal to or less than the given threshold value.

As described above, the circuit device 10 according to the present embodiment outputs the display image data IMD to the display device 100 by performing the color correction on the image data IM, and obtains the image data IMR after being subjected to the reverse color correction by performing the reverse color correction of the color correction on the display image data IMD. Then, the original image data IM and the image data IMR after being subjected to the reverse color correction are compared with each other, and the result of the comparison is output as the error detection information. In this manner, it is possible to check whether the color correction is appropriately performed by the color correction circuit 30 based on the error detection information from the comparison circuit 80. For example, when the color correction is color correction in accordance with the dimming control, it is possible to appropriately check whether the dimming control in the display device 100 is correctly executed. As a result, for example, reliability of the circuit device 10 can be improved.

The color correction circuit 30, the reverse color correction circuit 40, and the comparison circuit 80 are logic circuits. These logic circuits may be implemented as separate circuits, or may be implemented as an integrated circuit by automatic placement and wiring, or the like. Alternatively, a part or all of these logic circuits may be implemented by a processor such as a digital signal processor (DSP). In this case, a program or an instruction set in which a function of each circuit is described is stored in a memory, and the function of each circuit is implemented by a processor executing the program or the instruction set.

2. First Configuration Example

Figure 2:
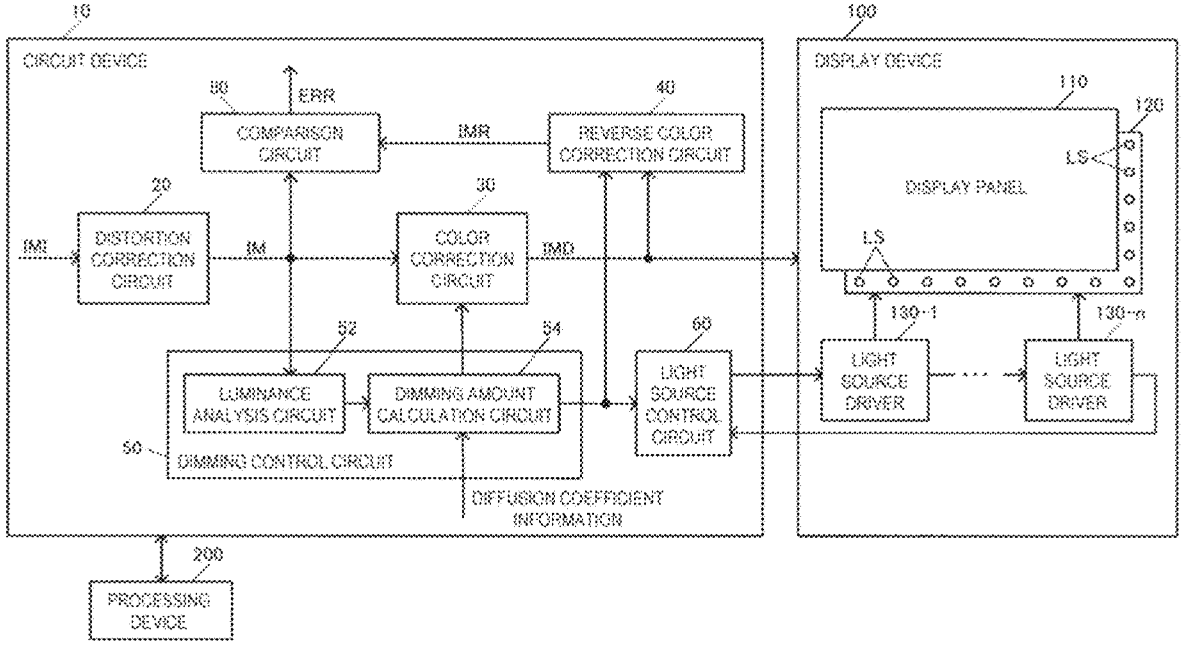
FIG. 2 shows a detailed first configuration example of the circuit device according to the present embodiment.

FIG. 2 shows a detailed first configuration example of the circuit device 10 according to the present embodiment. The circuit device 10 of FIG. 2 includes a distortion correction circuit 20, a dimming control circuit 50, and a light source control circuit 60 in addition to the configuration of FIG. 1.

The circuit device 10 is not limited to the configuration of the first configuration example of FIG. 2 or a configuration of another configuration example to be described later, and various modifications such as omitting a part of the components, adding other components, and replacing a part of the components with other components can be made.

A processing device 200 is provided outside the circuit device 10. The processing device 200 is, for example, a system on chip (SoC), and specifically is a microcomputer, a CPU, an MPU, or the like. For example, the circuit device 10 is communicably connected to the processing device 200 via an interface circuit (not shown). For example, input image data IMI from the processing device 200 is input to the circuit device 10 via the interface circuit.

The display device 100 includes a display panel 110, the backlight 120, and light source drivers 130-1 to **130-*n*. Here, n is an integer of 2 or more. The display device 100 may include a display driver (not shown) that drives the display panel 110. The display driver drives the display panel 110 based on the display image data IMD from the circuit device 10 to display on the display panel 110 a display image. The display driver may include a data driver that drives data lines of the display panel 110, a scanning driver that drives scanning lines of the display panel 110, a display controller, and the like. The backlight 120 is provided with a plurality of light sources LS. For example, the plurality of light sources LS are arranged in arrays. The display device 100** is a display device for an automobile used in a head-up display, a cluster display, or the like. In the following description, the head-up display is referred to as HUD appropriately.

Figure 3:
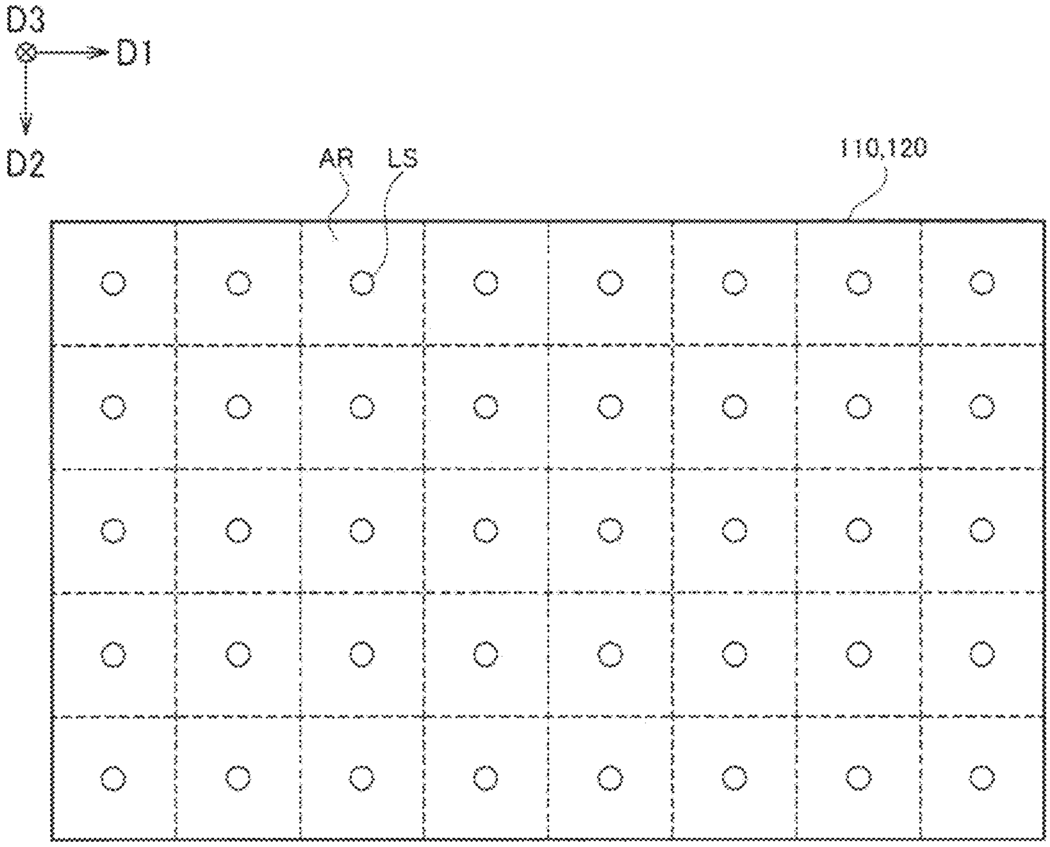
FIG. 3 shows configuration examples of a backlight and a display panel.

FIG. 3 shows configuration examples of the backlight 120 and the display panel 110. In FIG. 3, a direction D1 is a horizontal scanning direction of the display panel 110, and a direction D2 is a vertical scanning direction of the display panel 110. A direction D3 is a direction orthogonal to the directions D1 and D2, and is a direction in which the display panel 110 is viewed in a plan view. The backlight 120 is provided on a direction D3 side of the display panel 110, and emits illumination light in a direction opposite to the direction D3, which is a direction toward the display panel 110.

The backlight 120 includes the plurality of light sources LS. FIG. 3 shows an example in which 8×5 light sources LS are arranged in a two-dimensional array. That is, eight light sources LS are arranged along the direction D1, and five light sources LS are arranged along the direction D2. For appropriate local dimming, it is desirable to provide, for example, 100 or more light sources LS in the backlight 120. The light source LS is, for example, a light emitting diode (LED). The light source LS is not limited to the LED, and may be a light source whose light amount is independently controlled and which is close to a point light source. The light source close to the point light source is a light source in which a size of a light emitting portion of the light source LS is sufficiently smaller than an area AR corresponding to the light source LS. As the arrangement of the light sources LS, various arrangement forms such as a square arrangement and a hexagonal arrangement may be considered.

The display panel 110 has a pixel array, and an area in which the display image is displayed in the pixel array is set as a display area. The display area is divided into a plurality of areas AR. The light sources LS are disposed in the areas AR so that the light sources LS correspond to the areas AR, respectively. That is, one light source LS corresponds to one area AR. For example, when the display panel 110 is viewed in a plan view, the light source LS is disposed at a center of the area AR. However, an arrangement position of the light source LS is not limited thereto. In FIG. 3, the display area is divided into 8×5 areas AR, so as to correspond to 8×5 light sources LS. The area AR is used for processing in the circuit device 10, and the display image actually displayed on display panel 110 does not have a boundary of area AR. The display panel 110 is a panel in which a transmittance of each pixel is controlled in accordance with the display image, and the illumination light of the backlight 120 transmits through each pixel to display the display image. For example, the display panel 110 is a liquid crystal display panel.

Figure 4:
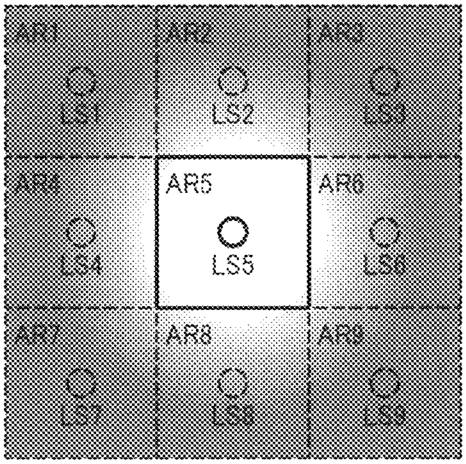
FIG. 4 is a schematic diagram showing a light source and a display area.

As described above, when the display area of the display panel 110 is divided into a plurality of areas such that the light sources LS are arranged in the respective areas AR, the light sources LS illuminating the display panel 110 each have a light intensity distribution in which a light intensity decreases as a distance from the light sources LS increases. Therefore, the light intensity in a peripheral portion becomes smaller than that in the center of the area AR. The light intensity distribution of the light source LS is referred to as PSF. FIG. 4 shows an example of the light intensity distribution of the PSF. In FIG. 4, the light intensity distribution is indicated by gradation, and as the light intensity is indicated whiter, a coefficient of the light intensity distribution is larger. In FIG. 4, a size of the PSF corresponds to 3×3 areas AR1 to AR9, and a center of the PSF is disposed at the position of the light source.

As shown in FIG. 2, the circuit device 10 includes the distortion correction circuit 20. The distortion correction circuit 20 performs distortion correction of the input image data IMI and outputs the image data IM. Then, the color correction circuit 30 performs the color correction on the image data IM from the distortion correction circuit 20. The input image data IMI is received from the processing device 200 via, for example, an interface circuit (not shown).

Specifically, the distortion correction circuit 20 performs the distortion correction on the input image data IMI by using coordinate conversion between pixel coordinates in the input image data IMI and pixel coordinates in the image data IM, and outputs a result thereof as the image data IM. The distortion correction is image correction for making the HUD display to have no or reduced distortion by applying, to an image, image distortion reversed to image distortion when the image displayed on the display panel 110 is projected. The image distortion due to projection includes image distortion due to a curved surface of a screen of the HUD, image distortion due to a HUD optical system, and both two kinds of image distortion. For example, the HUD presents an image to a user by projecting the image on a transparent screen or displaying the image on a transparent display panel. At this time, the image is deformed in accordance with curvature or the like of the transparent screen or the transparent display panel, so that the user can see the image without distortion. The distortion correction circuit 20 performs such image deformation processing as the distortion correction.

For example, the distortion correction circuit 20 performs a reverse mapping process or a forward mapping process. The reverse mapping is also referred to as a reverse warp, and is a mapping process in which the pixel coordinates in the image data IM, which is output image data, are subjected to the coordinate conversion to obtain reference coordinates corresponding to the pixel coordinates, and pixel data of the image data IM is obtained from pixel data of the input image data IMI at the reference coordinates. The forward mapping is also referred to as a forward warp, and is a mapping process in which the pixel coordinates in the input image data IMI are subjected to the coordinate conversion to obtain movement destination coordinates corresponding to the pixel coordinates, and pixel data of the image data IM at the movement destination coordinates is obtained from pixel data of the input image data IMI at the pixel coordinates. The coordinate conversion in the reverse mapping and the forward mapping is defined by a mapping parameter also referred to as map data. The mapping parameter is a table in which the coordinates on the input image are associated with the coordinates on the output image, a table indicating a movement amount between the coordinates on the input image and the coordinates on the output image, a coefficient of a polynomial in which the coordinates on the input image are associated with the coordinates on the output image, or the like.

The dimming control circuit 50 performs the dimming control of the light source based on the image data IM. Specifically, the dimming control circuit 50 performs the dimming control of the backlight 120 having a plurality of light sources, and implements the dimming control referred to as, for example, the local dimming. For example, the dimming control circuit 50 performs a calculation process for obtaining information on the dimming amount based on the image data IM. Here, the information on the dimming amount is information for specifying the luminance at which the light source emits light under the dimming control. The light source control circuit 60 performs control processing and instruction processing on the light source drivers 130-1 to 130-*n* of the display device 100 based on the information on the dimming amount from the dimming control circuit 50. The light source drivers 130-1 to 130-*n*, which are LED drivers, drive the light sources LS of the backlight 120 based on the information on the dimming amount, thereby implementing the dimming control of the backlight 120. For example, the local dimming in which the dimming control is performed for each of the plurality of areas obtained by dividing the display area of the display panel 110 is implemented.

A processing device such as a MCU for absorbing a difference in communication protocol depending on models of the light source drivers 130-1 to 130-*n* may be provided between the light source control circuit 60 and the light source drivers 130-1 to 130-*n*. In this case, the light source drivers 130-1 to 130-*n* are controlled by the light source control circuit 60 via the processing device such as the MCU.

The dimming control circuit 50 includes a luminance analysis circuit 52 and a dimming amount calculation circuit 54. The luminance analysis circuit 52 performs luminance analysis of the image data IM. Then, the dimming amount calculation circuit 54 calculates the dimming amount of each light source based on a result of the luminance analysis. Specifically, based on the image data IM, the luminance analysis circuit 52 searches each of the plurality of areas of the display area for a pixel having a maximum luminance in each area. Then, a luminance distribution for each light source is determined, so that a color of the searched maximum luminance can be displayed. Then, the dimming amount calculation circuit 54 performs a calculation process of recalculating the luminance for each pixel based on the determined luminance distribution of the light source and diffusion coefficient information of the light source, and calculates the dimming amount corresponding to the luminance value of the backlight 120 for each pixel. The diffusion coefficient information is, for example, information on a diffusion coefficient parameter of a diffusion plate 115 in FIG. 12 to be described later. In addition, the information on the dimming amount from the dimming amount calculation circuit 54 is sent to the light source drivers 130-1 to 130-*n* via the light source control circuit 60, and the light source drivers 130-1 to 130-*n* perform driving to cause the light sources of the respective areas of the plurality of areas to emit light in accordance with the dimming amount, thereby implementing the local dimming.

On the other hand, the color correction circuit 30 performs the color correction in accordance with the dimming control performed by the dimming control circuit 50, and outputs the display image data IMD to the display device 100. For example, the display image data IMD is output to the display device 100 via an interface circuit (not shown). For example, the color correction circuit 30 performs the color correction in accordance with the dimming control of the backlight 120 based on the information on the dimming amount from the dimming amount calculation circuit 54. For example, when the dimming control for decreasing the light amount of the light source is performed in the area corresponding to the light source, the color correction circuit 30 performs the color correction to increase the luminance of the pixel in the area by an amount corresponding to the decrease in light amount of the light source in the area, and outputs the display image data IMD after being subjected to the color correction to the display device 100. Accordingly, the light amount of the light source in the area can be reduced, and the image corresponding to the original image data IM can be displayed in the area based on the display image data IMD obtained by the color correction, so that the local dimming can be implemented. As a result, it is possible to reduce the power consumption of the backlight 120 and to display an image in which black pixels appear blacker.

Then, the reverse color correction circuit 40 performs the reverse color correction of the color correction on the display image data IMD after being subjected to the color correction to output the image data IMR after being subjected to the reverse color correction. For example, the reverse color correction circuit 40 performs the reverse color correction for returning the display image data IMD after being subjected to the color correction to the original image data IM before being subjected to the color correction based on the display image data IMD and the information on the dimming amount obtained by the dimming amount calculation circuit 54. For example, when the dimming control for decreasing the light amount of the light source is performed in the area corresponding to the light source and the color correction is performed to increase the luminance of the pixel in the area, the reverse color correction circuit 40 performs the reverse color correction for decreasing the luminance of the pixel in the area and returning the luminance to an original value, and outputs the image data IMR after being subjected to the reverse color correction.

The comparison circuit 80 compares the original image data IM with the image data IMR after being subjected to the reverse color correction from the reverse color correction circuit 40, and outputs the result of the comparison as an error detection signal ERR which is the error detection information of the display image data IMD. For example, when it is determined that the image data IM and the image data IMR after being subjected to the reverse color correction coincide with each other within a predetermined error range, the error detection signal ERR is set to inactive, and when it is determined that the image data IM and the image data IMR after being subjected to the reverse color correction do not coincide with each other beyond the predetermined error range, the error detection signal ERR is set to active. Specifically, the comparison circuit 80 obtains the index indicating the degree of coincidence between the image data IM and the image data IMR after being subjected to the reverse color correction, when the obtained index is equal to or less than the given threshold value, the error detection signal ERR is set to inactive, and when the index exceeds the threshold value, the error detection signal ERR is set to active. When an error is detected as described above and the error detection signal ERR is active, the circuit device 10 or the processing device 200 performs control of stopping the supply of the display image data IMD to the display device 100 and control of turning off the backlight 120. Accordingly, for example, when a problem occurs in the color correction circuit 30, the dimming control circuit 50, or the like due to a failure or the like, it is possible to prevent an inappropriate image from being displayed on the display device 100 or inappropriate dimming control from being performed.

As described above, in the present embodiment, when backlight control is performed in the display panel 110 such as the liquid crystal display panel, even if the light amount of the backlight 120 is changed, the color correction, which is color adjustment in consideration of a backlight adjustment amount, is performed on the display image data IMD in order to make colors of pixels to be displayed the same. Then, by performing the reverse color correction on the display image data IMD and comparing the display image data IMD with the image data IMR after being subjected to the reverse color correction, it is checked whether a color adjustment amount in the color correction is correct. For example, in the related art, the backlight control, particularly independent dimming control for each area of the display area, which is referred to as the local dimming, is mainly used to improve contrast in home televisions. Therefore, a safety function required in a system of an automobile is not required. For example, in the related art, since the backlight control and the color correction in consideration of the backlight adjustment amount are not performed in the system of the automobile, there is no request to check validity of the image data after being subjected to the color correction from the viewpoint of safety.

In this regard, in the present embodiment, in order to check that the image after being subjected to the color correction by the local dimming and an adjustment amount of the light source such as the LED are correct, a method is adopted in which the original image is regenerated based on the image after being subjected to the color correction, the luminance of the light source after the adjustment, and the information on the diffusion coefficient of the light source, and the regenerated image is compared with the input image. As a result, it is possible to check that the dimming control of the local dimming is correctly executed. That is, it is possible to check that a correction amount of the color and the adjustment amount of the light source match each other, that is, the same color is seen from human vision.

The color correction circuit 30, the reverse color correction circuit 40, the comparison circuit 80, the distortion correction circuit 20, the dimming control circuit 50, and the light source control circuit 60 are logic circuits, and these logic circuits may be implemented as separate circuits, or may be implemented as an integrated circuit by automatic placement and wiring, or the like. Alternatively, a part or all of these logic circuits may be implemented by a processor such as the DSP. The same applies to other configuration examples to be described later.

Figure 5:
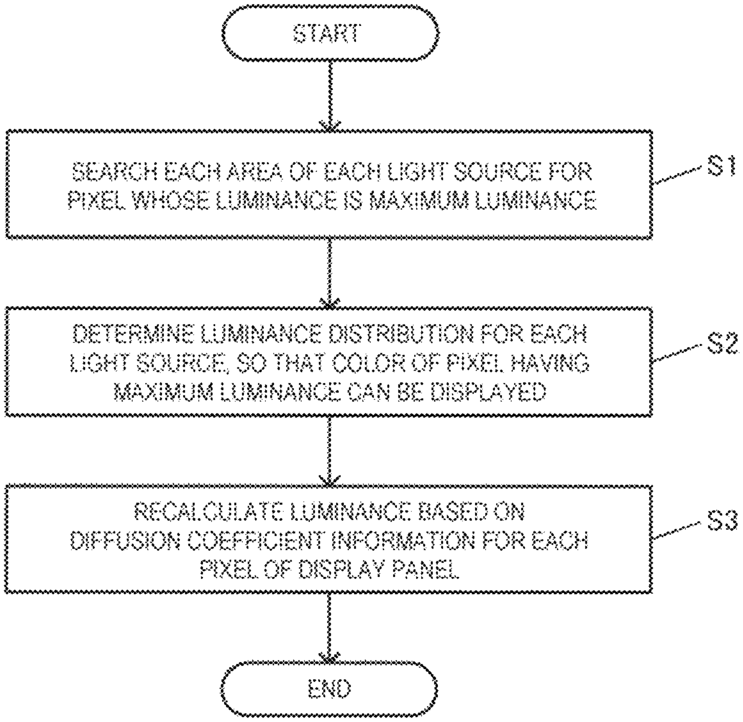
FIG. 5 is a flowchart showing a process of luminance calculation for each pixel.

Next, a specific processing example according to the present embodiment will be described. FIG. 5 is a flowchart showing a processing example of luminance calculation for each pixel. First, each area of each light source is searched for a pixel whose luminance is the maximum luminance (step S1). For example, in each area corresponding to each light source described with reference to FIGS. 3 and 4, based on the image data IM, luminances of pixels existing in the area are searched for, and the pixel whose luminance is the maximum luminance in the area is found. Then, a luminance distribution for each light source is determined, so that a color of the pixel having the maximum luminance can be displayed (step S2). For example, it is assumed that a luminance range is 0 to 100 and the luminance of the pixel having the maximum luminance is 50 in a target area. In this case, the luminance distribution of the light source is determined, so that a pixel having a luminance of 50, which is the maximum luminance, can be displayed in a color having a luminance of 100, which is an upper limit of the luminance range, for example. When the luminance of the pixel having the maximum luminance is the upper limit luminance of the luminance range, luminances of other pixels are guaranteed to fall within the luminance range of 0 to 100. Then, for each pixel of the display panel 110, the luminance is recalculated based on the diffusion coefficient information (step S3). As a result, the luminance value of the backlight 120 for each pixel is obtained.

Figure 12:
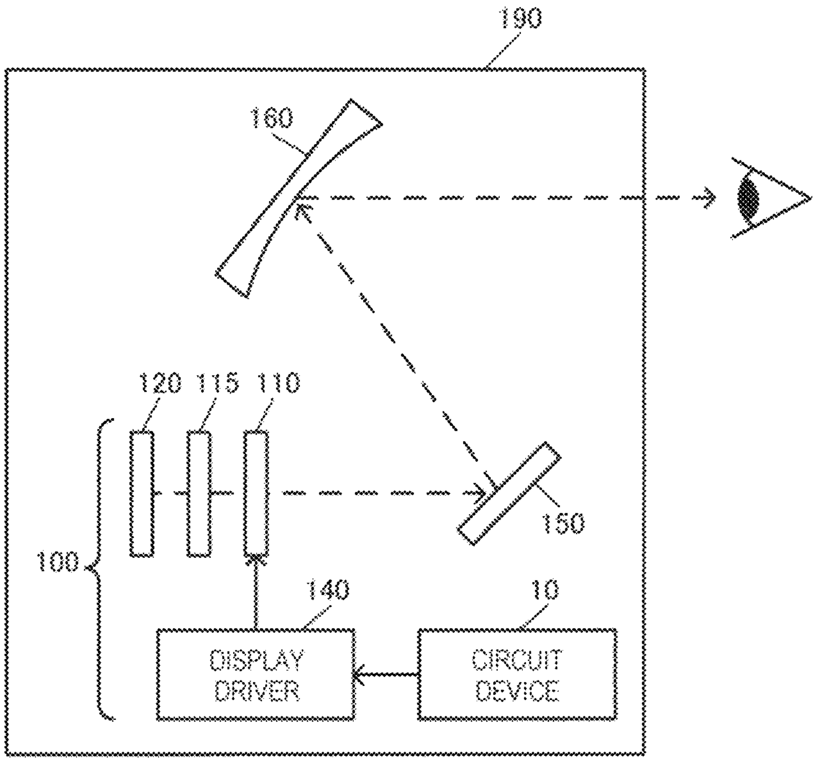
FIG. 12 shows a configuration example of a head-up display which is an example of a display system according to the present embodiment.

For example, as shown in FIG. 12 to be described later, in the display device 100, the diffusion plate 115 for diffusing light from the light source to obtain a uniform luminance distribution is provided, for example, between the backlight 120 and the display panel 110. The diffusion plate 115 is also referred to as a diffusion sheet. For example, as shown in FIG. 4, the light intensity distribution PSF of the light source is the intensity distribution in which the light intensity decreases as the distance from the light source increases, but by providing the diffusion plate 115 and diffusing the light from the light source, luminance unevenness can be reduced, and a uniform surface light source can be implemented. Here, examples of a light diffusion type include a direct type, a side light type, and an edge light type. Then, in step S3 of FIG. 5, in addition to the light intensity distribution PSF of the light source of FIG. 4, the diffusion of the light from the light source using the diffusion plate 115 is also reflected, and the luminance of each pixel of the display panel 110 is recalculated to obtain the luminance value of the backlight 120 for each pixel. As an example, for a target pixel, light intensities of the light sources of, for example, 4×4 LEDs around the target pixel are obtained based on the light intensity distribution PSF of FIG. 4 and the diffusion coefficient information of the diffusion plate 115 to recalculate the luminance and obtain the luminance value of the backlight 120 for each pixel. In this manner, in the display device 100 including the backlight 120 having the plurality of light sources and the diffusion plate 115, it is possible to appropriately obtain the luminance value of the backlight 120 for each pixel.

Figure 6:
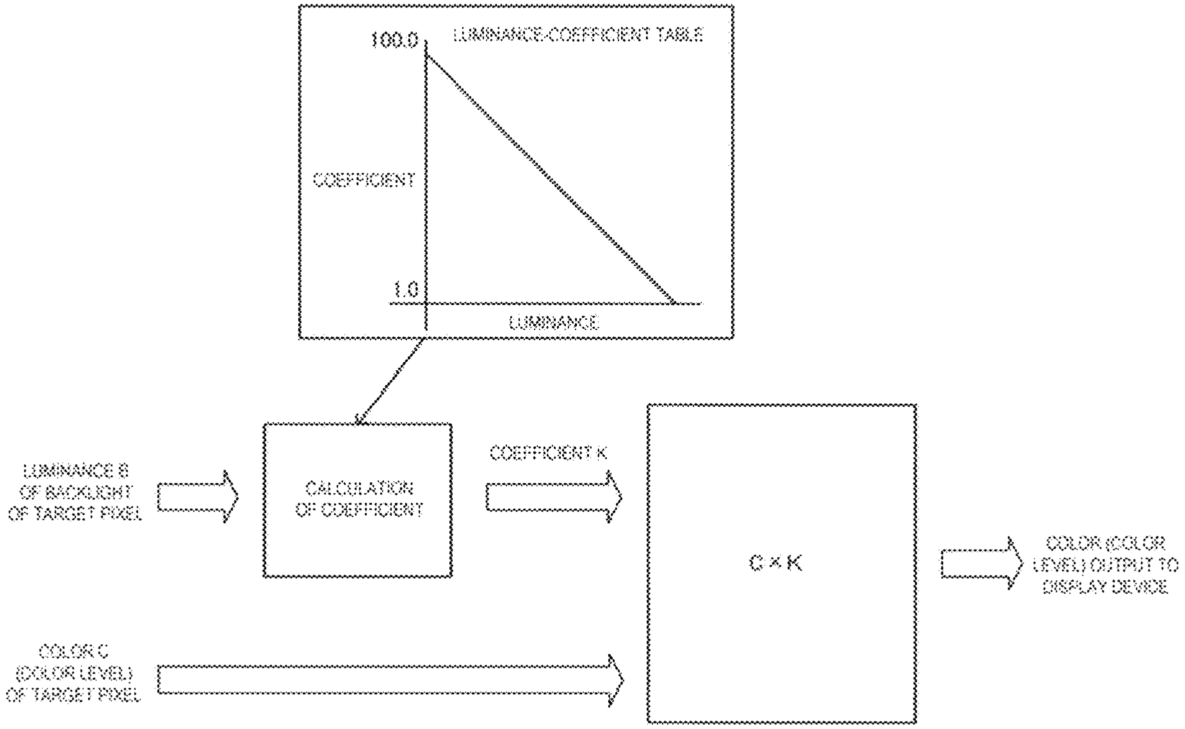
FIG. 6 is a schematic diagram of color correction.

FIG. 6 is a schematic diagram of a processing example of the color correction. First, as described with reference to FIG. 5, a luminance B of the backlight 120 of a target pixel is obtained. In addition, a luminance-coefficient table is stored in a storage circuit (not shown) of the circuit device 10, and a coefficient K is calculated based on the luminance B of the backlight 120 using the table. The luminance-coefficient table in FIG. 6 is a table in which the coefficient K increases as the luminance B decreases. Instead of using such a luminance-coefficient table, the coefficient K may be obtained from the luminance B based on a predetermined calculation formula. In addition, although the luminance-coefficient table in FIG. 6 has primary characteristics, the present disclosure is not limited thereto, and appropriate characteristics in accordance with characteristics of human eyes with respect to the brightness of light may be used. Alternatively, the coefficient K may be obtained by interpolating two output values of the luminance-coefficient table by primary interpolation, spline interpolation, or the like. Then, a multiplication process of the coefficient K obtained in this manner and a level of a color C of the target pixel is performed to obtain a level of a color to be output to the display device 100. That is, a process of increasing a color level of image data is performed on a pixel having the low luminance B of the backlight 120. In this manner, the color correction circuit 30 can obtain the display image data IMD from the image data IM and output the display image data IMD to the display device 100. In the luminance-coefficient table of FIG. 6, the coefficient K increases as the luminance B of the backlight 120 decreases, and thus, the lower the luminance of the backlight 120 for the target pixel is, the higher the color level of the target pixel is, and the dimming control can be implemented.

Figure 7:
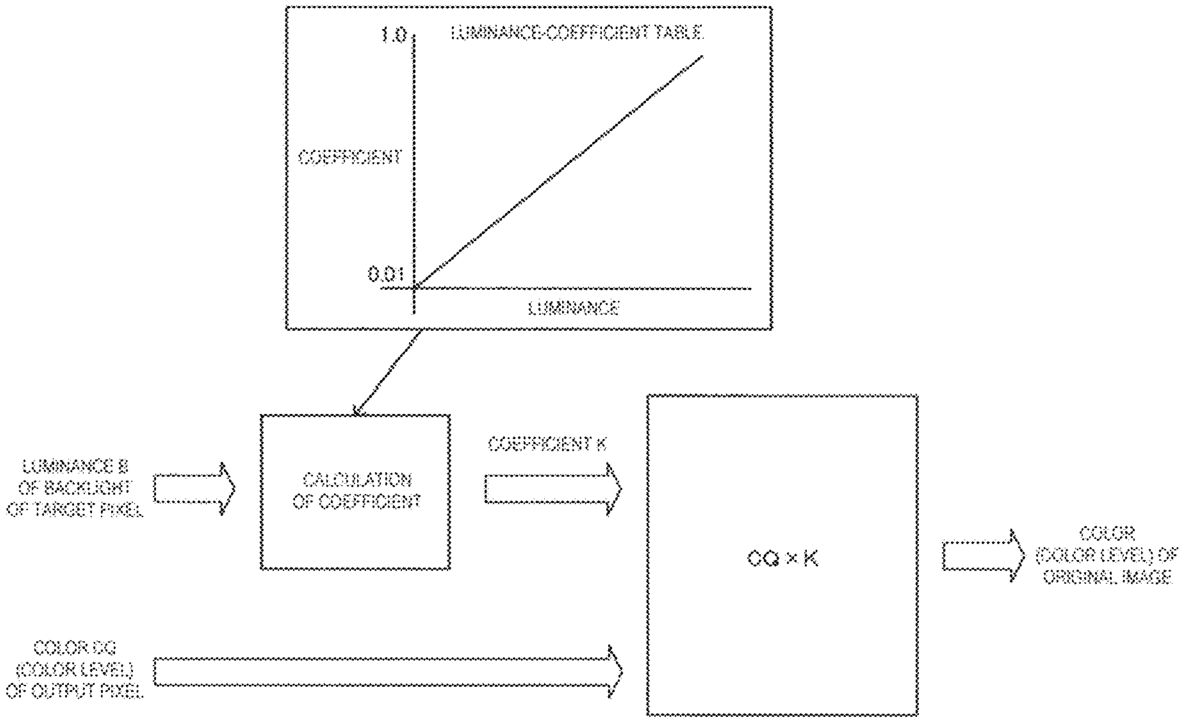
FIG. 7 is a schematic diagram of reverse color correction.

FIG. 7 is a schematic diagram of a processing example of the reverse color correction. First, the coefficient K is calculated based on the luminance B of the backlight 120 of the target pixel and the luminance-coefficient table. The luminance-coefficient table of FIG. 6 has the characteristic that the coefficient K increases as the luminance B of the backlight 120 decreases, but the luminance-coefficient table of FIG. 7 has a characteristic contrary to FIG. 6 that the coefficient K decreases as the luminance B decreases. By using the table having such a characteristic, it is possible to implement the reverse color correction of the color correction of FIG. 6. Then, a multiplication process of the coefficient K obtained in this manner and a level of a color CQ of an output pixel is performed to obtain a color level of the original image. That is, in the color correction, the process of increasing the color level of the image data is performed on the pixel having the low luminance B of the backlight 120, whereas in the reverse color correction, a process of decreasing the color level of the image data is performed on the pixel having the low luminance B of the backlight 120. In this manner, the reverse color correction circuit 40 can obtain the image data IMR after being subjected to the reverse color correction corresponding to the original image data IM from the display image data IMD and output the image data IMR after being subjected to the reverse color correction to the comparison circuit 80. That is, in the luminance-coefficient table of FIG. 7, the coefficient K decreases as the luminance of the backlight 120 decreases, and thus, the reverse color correction, which is reverse conversion of the color correction in FIG. 6, can be performed on the display image data IMD to obtain the image data IMR after being subjected to the reverse color correction corresponding to the original image data IM. Then, the comparison circuit 80 compares the image data IMR after being subjected to the reverse color correction with the original image data IM, so that it is possible to detect whether a problem occurs in the color correction of the color correction circuit 30 and the dimming control of the dimming control circuit 50.

Instead of using the luminance-coefficient table as shown in FIG. 7, the coefficient K may be obtained from the luminance B based on a predetermined calculation formula. Alternatively, the coefficient K may be obtained by interpolating two output values of the luminance-coefficient table by primary interpolation, spline interpolation, or the like. Although the color correction table and the reverse color correction table are separately provided in FIGS. 6 and 7, the color level of the original image may be obtained by calculating the coefficient K using the color correction table of FIG. 6 and performing division processing of the coefficient K on the color CQ of the output pixel.

As described above, in the present embodiment, the color correction circuit 30 performs the color correction on the image data IM in accordance with the display image data IMD and the luminance of the light source of the display device 100 that displays the image using the light source. Then, the reverse color correction circuit 40 performs the reverse color correction in accordance with the luminance of the light source of the display device 100 on the display image data IMD.

In this manner, when the dimming control for controlling the luminance of the light source of the display device 100 is performed, the color correction in accordance with the luminance of the light source due to the dimming control is performed on the image data IM, and the display image data IMD after being subjected to the color correction is output to the display device 100. Further, the reverse color correction in accordance with the luminance of the light source is performed on the display image data IMD, so that the image data IMR after being subjected to the reverse color correction corresponding to the original image data IM can be output to the comparison circuit 80. Therefore, by comparing the original image data IM with the image data IMR after being subjected to the reverse color correction, it is possible to check whether the color correction and the dimming control for controlling the luminance of the light source are correctly performed.

Specifically, as shown in FIG. 2, the display device 100 includes the display panel 110 and the backlight 120 including the plurality of light sources. Further, as described with reference to FIGS. 3 and 4, the light sources of the plurality of light sources are provided corresponding to the respective areas of the plurality of areas of the display panel 110. Then, the color correction circuit 30 performs the color correction in accordance with the luminance of each light source on the image data IM, and the reverse color correction circuit 40 performs the reverse color correction in accordance with the luminance of each light source on the display image data IMD.

In this manner, when the dimming control for controlling the luminances of the plurality of light sources of the backlight 120 is performed, the color correction in accordance with the luminance of each of the plurality of light sources due to the dimming control is performed on each pixel irradiated with the light from each light source in the image data IM, and the display image data IMD after being subjected to the color correction is output to the display device 100. Further, the reverse color correction in accordance with the luminance of each of the plurality of light sources of the backlight 120 is performed on each pixel irradiated with the light from each light source in the display image data IMD, so that the image data IMR after being subjected to the reverse color correction corresponding to the original image data IM can be output to the comparison circuit 80. Therefore, by comparing the original image data IM with the image data IMR after being subjected to the reverse color correction, it is possible to check whether the color correction and the dimming control of the backlight 120 are correctly performed.

For example, in the display device 100, light from the light source of the backlight 120 is emitted to the display panel 110, and the display panel 110 is driven to display based on the display image data IMD from the circuit device 10, thereby displaying an image. Taking a head-up display 190 in FIG. 12 as an example, a virtual image corresponding to the display image is displayed for the user by projecting the display image of the display panel 110 onto a transparent screen 160 which is the windscreen. The dimming control circuit 50 performs the dimming control for controlling the luminance of the light source of the backlight 120 based on the image data IM.

Then, the color correction circuit 30 performs the color correction in accordance with the luminance of the light source of the backlight 120 as described with reference to FIG. 6. For example, the color correction circuit 30 performs the color correction to increase the color level of each pixel of the display image data IMD as the luminance of the light source decreases due to the dimming control. That is, for the pixel in which the luminance of the light source decreases due to the dimming control, the color correction is performed to increase the luminance of the color of the pixel. As a result, the local dimming is implemented.

On the other hand, the reverse color correction circuit 40 performs the reverse color correction in accordance with the luminance of the light source of the backlight 120 as described with reference to FIG. 7. For example, the reverse color correction circuit 40 performs the reverse color correction to decrease the color level of each pixel of the image data IMR after being subjected to the reverse color correction as the luminance of the light source decreases due to the dimming control. That is, for the pixel in which the luminance of the color is increased by the color correction, the reverse color correction for decreasing the luminance of the color is performed to generate the image data IMR after being subjected to the reverse color correction by restoring the original image data IM. Therefore, by the comparison circuit 80 comparing the image data IM with the image data IMR after being subjected to the reverse color correction, it is possible to check whether the color correction and the dimming control are correctly performed.

As shown in FIG. 2, the circuit device 10 includes the luminance analysis circuit 52 that performs the luminance analysis of the image data IM, and the dimming amount calculation circuit 54 that calculates the dimming amount of each light source based on the result of the luminance analysis. The color correction circuit 30 performs the color correction based on the calculation result of the dimming amount obtained by the dimming amount calculation circuit 54, and the reverse color correction circuit 40 performs the reverse color correction based on the calculation result of the dimming amount performed by the dimming amount calculation circuit 54. In this manner, the dimming amount of each of the plurality of light sources of the backlight 120 is calculated based on the result of the luminance analysis of the image data IM, and the dimming control of the backlight 120 is performed based on the calculated dimming amount. Then, the color correction is performed based on the dimming amount calculated in this manner, so that the color correction in accordance with the dimming control of the backlight 120 is performed, and the display image data IMD after being subjected to the color correction can be output to the display device 100. Further, the reverse color correction in accordance with the calculated dimming amount is performed on the display image data IMD after being subjected to the color correction, so that the image data IMR after being subjected to the reverse color correction corresponding to the image data IM before being subjected to the color correction is generated, and can be compared with the image data IM by the comparison circuit 80.

Further, the dimming amount calculation circuit 54 calculates the dimming amount of each light source based on the diffusion coefficient information of the backlight 120 and the result of the luminance analysis. For example, as shown in FIG. 12, when the diffusion plate 115 is provided for the backlight 120 and the light of the light source of the backlight 120 is diffused, the dimming amount of each light source is calculated based on the diffusion coefficient information of the light of the light source by the diffusion plate 115 and the result of the luminance analysis of the image data IM. In this manner, when the luminance unevenness is reduced by diffusing the light from the light source of the backlight 120, it is possible to perform the dimming control, in which the diffusion of the light of the light source is reflected, and the color correction.

In addition, the circuit device 10 according to the present embodiment includes the distortion correction circuit 20 that performs the distortion correction of the input image data IMI and outputs the image data IM. In this manner, it is possible to perform the color correction and the dimming control based on the image data IM after being subjected to the distortion correction by the distortion correction circuit 20. Therefore, even in the display device 100 that requires the distortion correction for the image display, it is possible to implement the appropriate color correction and dimming control. Specifically, for example, as shown in FIG. 12, even when the transparent screen 160, which is a projection surface of the display image of the display device 100, is curved, the distortion correction in accordance with the curvature is performed, so that an image without distortion can be displayed to the user, and the appropriate color correction and dimming control can be implemented.

3. Second Configuration Example

Figure 8:
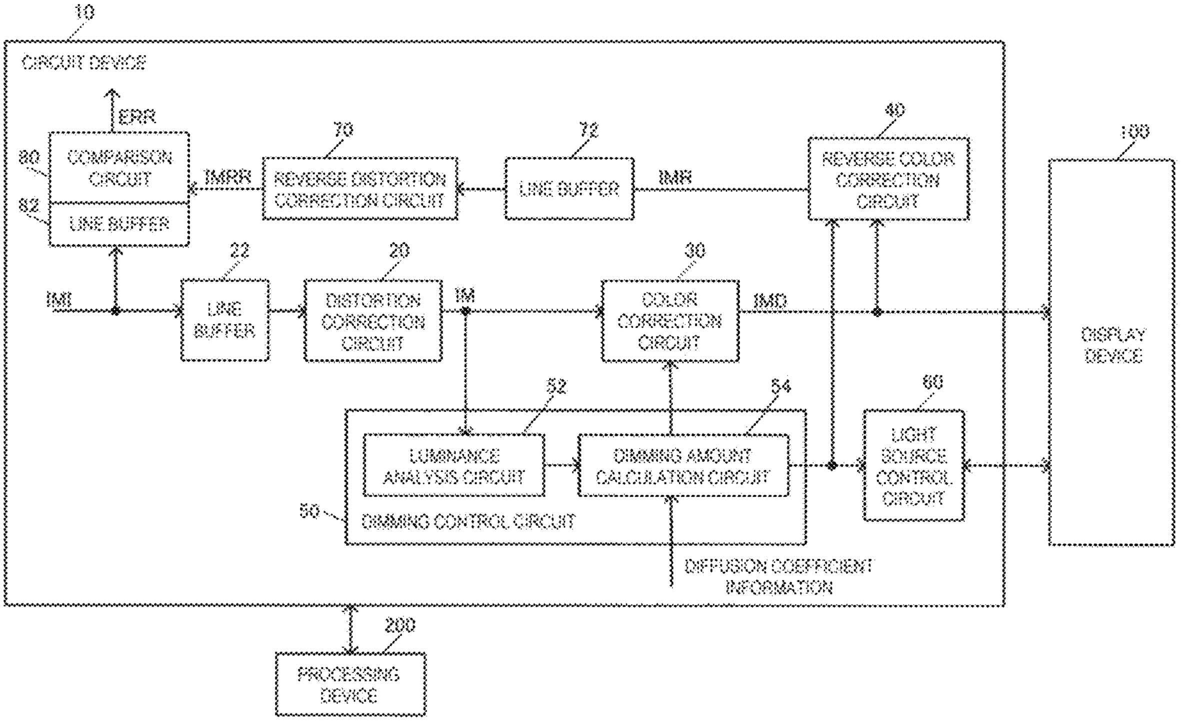
FIG. 8 shows a detailed second configuration example of the circuit device according to the present embodiment.

FIG. 8 shows a detailed second configuration example of the circuit device 10 according to the present embodiment. In the second configuration example, in addition to the configuration of FIG. 2, a reverse distortion correction circuit 70 and line buffers 22, 72, 82 are provided. For example, in FIG. 2, the comparison circuit 80 compares the image data IM after being subjected to the distortion correction with the image data IMR after being subjected to the reverse color correction. On the other hand, in FIG. 8, the comparison circuit 80 compares the input image data IMI before being subjected to the distortion correction with the image data IMRR after being subjected to the reverse distortion correction obtained by performing the reverse distortion correction on the image data IMR after being subjected to the reverse color correction, and outputs the error detection signal ERR when the input image data IMI and the image data IMRR do not match each other. The input image data IMI is, for example, image data received from the processing device 200 or the like outside the circuit device 10.

For example, the distortion correction circuit 20 performs, as a distortion correction process, a mapping process of mapping an image in accordance with a surface shape of a projection target object. The mapping process is a process of deforming an image, so that the image projected on the projection target object is not distorted when viewed from the user. On the other hand, the reverse distortion correction circuit 70 performs, as a reverse distortion correction process, a reverse mapping process corresponding to reverse conversion of the mapping process performed by the distortion correction circuit 20. The reverse mapping process is conversion for returning an image deformed in accordance with the projection target object to the image before being deformed. The projection target object is an object on which the display image generated by the circuit device 10 is projected or displayed. In a case of an in-vehicle head-up display, the projection target object is a windscreen of an automobile or the like. The mapping process is a process of performing the coordinate conversion of a pixel position of an image based on the mapping parameter which is also referred to as the map data. The mapping process can include interpolation processing of pixel values and the like as processing associated with the coordinate conversion. The mapping process includes the forward mapping and the reverse mapping. The mapping parameter is a parameter indicating the coordinate conversion corresponding to a shape of a reflective surface of the projection target object, and is table data or the like that associates the pixel position of the image before the mapping process with the pixel position of the image after the mapping process. The mapping process performed by the distortion correction circuit 20 and the reverse mapping process performed by the reverse distortion correction circuit 70 can be implemented using the mapping parameter. In addition, the line buffer 22 is provided at a preceding circuit of the distortion correction circuit 20, and the distortion correction circuit 20 performs the distortion correction using the input image data IMI temporarily stored and accumulated in the line buffer 22. In addition, the line buffer 72 is also provided at a preceding circuit of the reverse distortion correction circuit 70, and the reverse distortion correction circuit 70 performs the reverse distortion correction using the image data IMI after being subjected to the reverse color correction temporarily stored and accumulated in the line buffer 72. Similarly, the line buffer 82 is provided at a preceding circuit of the comparison circuit 80. The line buffers 22, 72 and 82 temporarily store image data of scanning line segments of a predetermined number of lines, for example.

As described above, the circuit device 10 of FIG. 8 includes the distortion correction circuit 20 that performs the distortion correction on the input image data IMI to output the image data IM, the color correction circuit 30 that performs the color correction on the image data IM to output the display image data IMD to the display device 100, and the reverse color correction circuit 40 that performs the reverse color correction of the color correction on the display image data IMD to output the image data IMR after being subjected to the reverse color correction. The circuit device 10 further includes the reverse distortion correction circuit 70 that performs the reverse distortion correction of the distortion correction on the image data IMR after being subjected to the reverse color correction to output the image data IMRR after being subjected to the reverse distortion correction, and the comparison circuit 80 that compares the input image data IMI with the image data IMRR after being subjected to the reverse distortion correction to output a comparison result as the error detection information of the display image data IMD. In this manner, the comparison circuit 80 can detect not only whether the color correction is appropriately performed by the color correction circuit 30 but also whether the distortion correction is appropriately performed by the distortion correction circuit 20. In addition, it is also possible to detect whether the dimming control is appropriately performed by the dimming control circuit 50. As a result, for example, the reliability of the circuit device 10 can be improved.

4. Third Configuration Example

Figure 9:
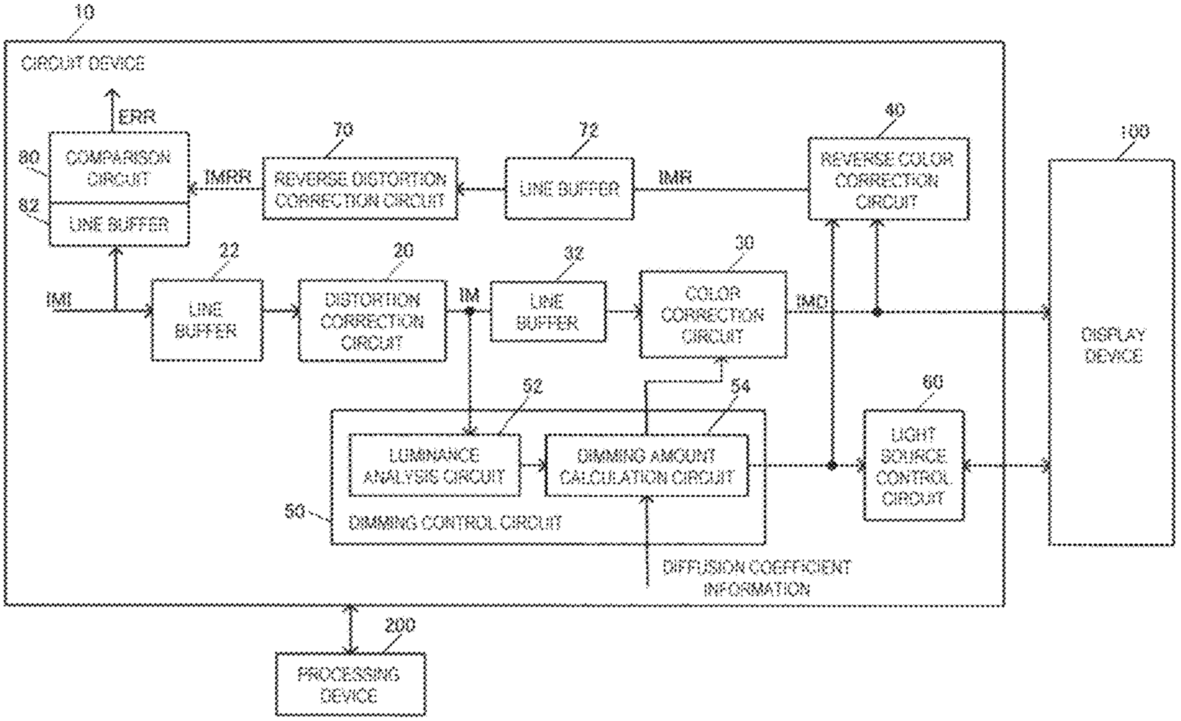
FIG. 9 shows a detailed third configuration example of the circuit device according to the present embodiment.

FIG. 9 shows a detailed third configuration example of the circuit device 10 according to the present embodiment. In the third configuration example, in addition to the configuration of FIG. 8, a line buffer 32 is provided at a preceding circuit of the color correction circuit 30. That is, the circuit device 10 of FIG. 9 includes the line buffer 32 that temporarily stores the image data IM. For example, the image data IM after being subjected to the distortion correction from the distortion correction circuit 20 is temporarily stored and accumulated in the line buffer 32. Then, the color correction circuit 30 performs the color correction on the image data IM temporarily stored in the line buffer 32. In this manner, after the completion of the luminance analysis performed by the luminance analysis circuit 52 and the calculation process of the dimming amount performed by the dimming amount calculation circuit 54, the color correction circuit 30 performs the color correction on the image data IM temporarily stored in the line buffer 32, so that the display image data IMD can be output to the display device 100.

That is, a predetermined processing time is required for the luminance analysis performed on the image data IM and the calculation process of the dimming amount based on the result of the luminance analysis. Therefore, when the display image data IMD corresponding to the dimming control is output from the color correction circuit 30 to the display device 100 before the dimming control based on the calculation result of the dimming amount of the dimming amount calculation circuit 54 is performed, a problem occurs in image display on the display device 100. In this case, a method of performing the color correction, luminance analysis, and calculation of the dimming amount on the image data IM corresponding to the input image data IMI to output the display image data IMD, for example, with a delay of one frame may be considered, but in this method, quality or the like of a moving image display may deteriorate. Therefore, in FIG. 9, the line buffer 32 temporarily stores the image data IM of the scanning line segments of the predetermined number of lines such as several tens of lines, and the luminance analysis circuit 52 and the dimming amount calculation circuit 54 complete the luminance analysis and calculation process of the dimming amount in the processing time corresponding to the predetermined number of lines. The color correction circuit 30 then waits for this processing time, performs the color correction on the image data IM accumulated in the line buffer 32, and outputs the display image data IMD after being subjected to the color correction to the display device 100. In this manner, after the luminance analysis and the calculation process of the dimming amount are completed, the display image data IMD subjected to the color correction based on the calculation result of the dimming amount is output to the display device 100, and the dimming control based on the calculation result of the dimming amount can be performed. Therefore, the display image based on the display image data IMD subjected to the appropriate color correction can be displayed by performing the appropriate dimming control.

5. Fourth Configuration Example

Figure 10:
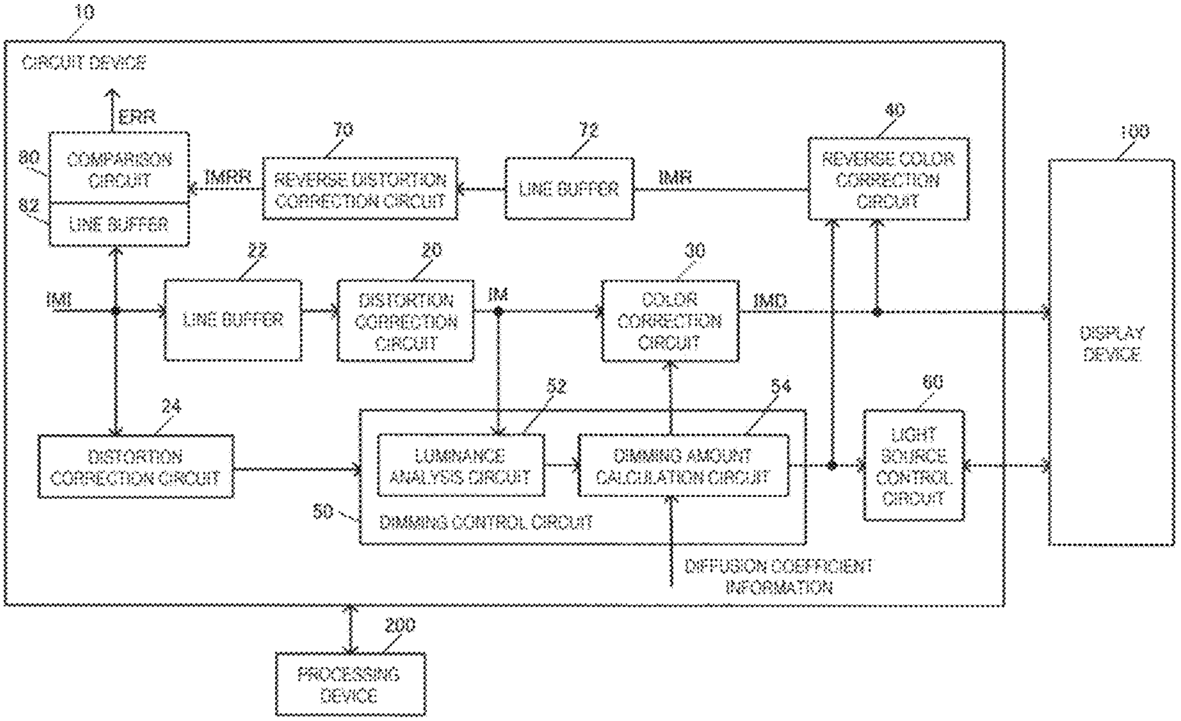
FIG. 10 shows a detailed fourth configuration example of the circuit device according to the present embodiment.

FIG. 10 shows a detailed fourth configuration example of the circuit device 10 according to the present embodiment. In the fourth configuration example, a distortion correction circuit 24 is further provided in addition to the configuration of FIG. 8. The distortion correction circuit 24 performs the distortion correction on the input image data IMI and outputs the image data after being subjected to the distortion correction to the luminance analysis circuit 52. As described above, by providing the distortion correction circuit 24 that performs the distortion correction on the input image data IMI separately from the distortion correction circuit 20, the display image data IMD can be output to the display device 100 after the calculation of the dimming amount is completed even without providing the line buffer 32 as shown in FIG. 9. That is, the same function as that of the line buffer 32 of FIG. 9 can be implemented.

Here, the output of the image data from the distortion correction circuit 24 is not performed in an order of pixels from an upper left pixel of the screen to a lower right pixel of the screen while being horizontally scanned, but is performed in a random order. On the other hand, the luminance analysis circuit 52 performs the luminance analysis for each area of each light source as described with reference to FIG. 5. Therefore, even when the pixel data is output from the distortion correction circuit 24 in the random order, the luminance analysis circuit 52 can determine in which area of the plurality of areas described with reference to FIG. 3 the coordinates of the pixel data are located, and can execute the luminance analysis for each area. As a result, the luminance analysis and the calculation of the dimming amount can be completed quickly, and the display image data IMD can be output to the display device 100 after the calculation of the dimming amount is completed without providing the line buffer 32 of FIG. 9.

6. Fifth Configuration Example

Figure 11:
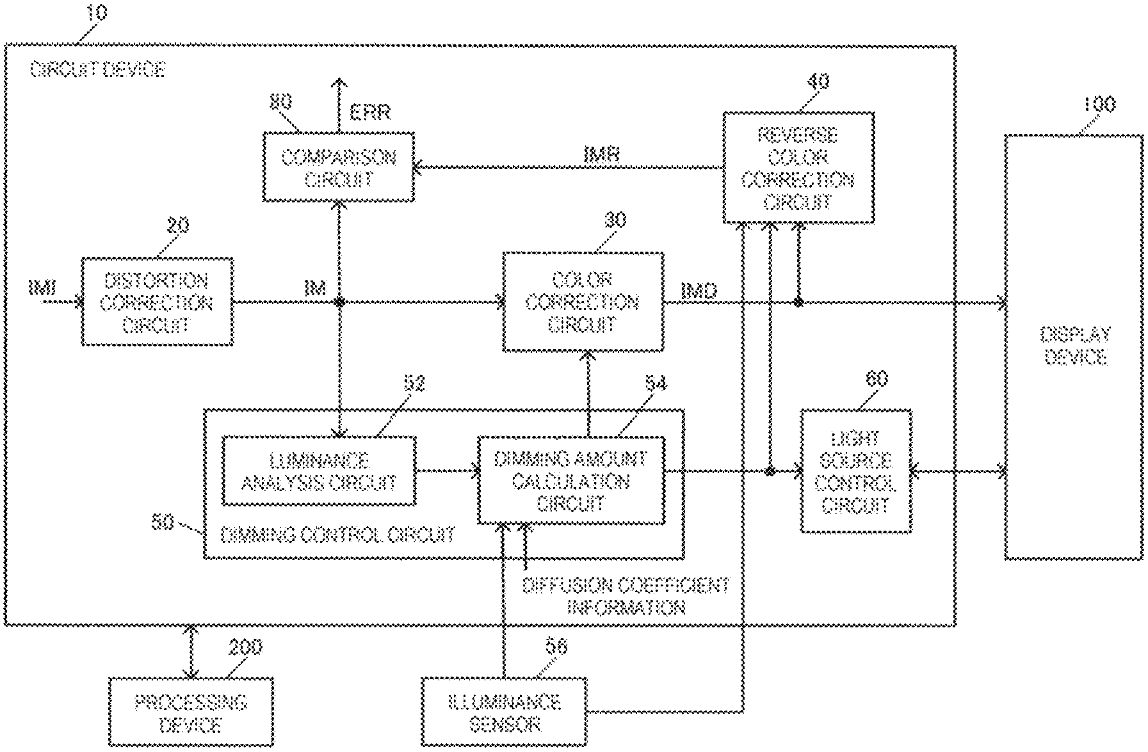
FIG. 11 shows a detailed fifth configuration example of the circuit device according to the present embodiment.

FIG. 11 shows a detailed fifth configuration example of the circuit device 10 according to the present embodiment. In the fifth configuration example, the dimming amount calculation circuit 54 calculates the dimming amount based on detection information from an illuminance sensor 56 that detects external light. The reverse color correction circuit 40 performs the reverse color correction based on the detection information from the illuminance sensor 56. In this manner, it is possible to perform the dimming control by the dimming amount calculated based on the detection information of brightness and darkness of the external light by the illuminance sensor 56. Then, when the dimming control reflecting the detection information of the illuminance sensor 56 is performed and the color correction in accordance with the dimming control is performed, the reverse color correction circuit 40 performs the reverse color correction based on the detection information from the illuminance sensor 56, so that the image data after being subjected to the reverse color correction corresponding to the original image data IM can be appropriately generated.

For example, in the HUD, it is desirable to perform the dimming control for darkening the backlight 120 at night or when the vehicle enters a tunnel. On the other hand, it is desirable to perform the dimming control to brighten the backlight 120 in the daytime or when light from the sun or the like is strong. For this purpose, the illuminance sensor 56 is provided to detect brightness and darkness of the environment, and the dimming amount calculation circuit 54 calculates the dimming amount based on the detection information of the illuminance sensor 56. As a result, the dimming control reflecting the detection information of the illuminance sensor 56 is performed, and the color correction circuit 30 performs the color correction in accordance with the dimming control reflecting the detection information of the illuminance sensor 56 in this manner. The reverse color correction circuit 40 performs the reverse color correction in which not only the dimming control of the normal local dimming but also the dimming control based on the detection information from the illuminance sensor 56 is reflected. As a result, the image data IMR after being subjected to the reverse color correction corresponding to the original image data IM is restored, and the comparison circuit 80 compares the image data IM with the image data IMR after being subjected to the reverse color correction, so that the error detection information can be output when the image data IM and the image data IMR do not match.

Although the first configuration example to the fifth configuration example according to the present embodiment are described above, the present embodiment is not limited thereto, and various modifications such as a configuration in which at least two configuration examples of the first configuration example to the fifth configuration example are combined are possible.

7. Display System

FIG. 12 shows a configuration example of the head-up display 190 as an example of the display system according to the present embodiment. The head-up display 190, which is the display system according to the present embodiment, includes the circuit device 10 according to the present embodiment and the display device 100. The display device 100 displays the display image based on the display image data IMD from the circuit device 10. When the display system is the head-up display 190, the display device 100 displays a virtual image to the user by projecting the display image. For example, the display device 100 includes the display panel 110 and the backlight 120. The display device 100 may include the display driver 140 that drives the display panel 110, and the diffusion plate 115 provided between the display panel 110 and the backlight 120. The display device 100 may include a projection optical system such as a mirror 150 that reflects projection light of a projection image.

The display driver 140 drives the data lines and the scanning lines of the display panel 110 to display the image based on the display image data IMD from the circuit device 10. The light emitted from the backlight 120 passes through the diffusion plate 115 and the display panel 110, and is reflected by the mirror 150 toward a direction of the transparent screen 160. The transparent screen 160 is, for example, a windscreen of an automobile. A reflective surface of the transparent screen 160 is, for example, a concave surface, and the projection image is a virtual image as viewed from the user. That is, when viewed from the user, the projection image appears to be formed farther than the transparent screen 160. As a result, the projection image can be displayed in the background.

The display system according to the present embodiment is not limited to the configuration shown in FIG. 12, and various modifications can be made. For example, a display panel other than the liquid crystal display panel may be used as the display panel 110, and various modifications of the arrangement of the diffusion plate 115 and the projection optical system can be made. In addition, the display system according to the present embodiment is not limited to the head-up display 190 as shown in FIG. 12, and may be another display system for an automobile such as a cluster display, or may be a display system for an application other than the automobile.

As described above, the circuit device according to the present embodiment includes a color correction circuit configured to perform color correction on image data to output display image data to a display device, a reverse color correction circuit configured to perform reverse color correction of the color correction on the display image data to output image data after being subjected to the reverse color correction, and a comparison circuit configured to compare the image data with the image data after being subjected to the reverse color correction to output a result of the comparison as error detection information of the display image data.

According to the present embodiment, the color correction is performed on the image data to output the display image data after being subjected to the color correction to the display device, and the image data after being subjected to the reverse color correction is obtained by performing the reverse color correction of the color correction on the display image data. Then, the image data and the image data after being subjected to the reverse color correction are compared with each other, and the result of the comparison is output as the error detection information. In this manner, it is possible to check whether the color correction is appropriately performed by the color correction circuit based on the error detection information from the comparison circuit, thereby improving the reliability of the circuit device, or the like.

In addition, in the present embodiment, the color correction circuit may perform the color correction on the image data in accordance with the display image data and a luminance of a light source of the display device that displays an image using the light source, and the reverse color correction circuit may perform the reverse color correction on the display image data in accordance with the luminance of the light source.

In this manner, by comparing the image data with the image data after being subjected to the reverse color correction, it is possible to check whether the color correction and the dimming control for controlling the luminance of the light source are correctly performed.

In the present embodiment, the display device may include a display panel and a backlight including a plurality of light sources, and the light sources of the plurality of light sources may be provided corresponding to respective areas of the plurality of areas of the display panel. Then, the color correction circuit may perform the color correction in accordance with the luminance of each light source on the image data, and the reverse color correction circuit may perform the reverse color correction in accordance with the luminance of each light source on the display image data.

In this manner, by comparing the image data with the image data after being subjected to the reverse color correction, it is possible to check whether the color correction and the dimming control of each light source of the backlight are correctly performed.

In the present embodiment, the circuit device may further include a luminance analysis circuit configured to perform luminance analysis of the image data, and a dimming amount calculation circuit configured to calculate a dimming amount of each light source based on a result of the luminance analysis. Then, the color correction circuit may perform the color correction based on a calculation result of the dimming amount, and the reverse color correction circuit may perform the reverse color correction based on the calculation result of the dimming amount.

In this manner, the dimming amount of each light source of the backlight is calculated based on the result of the luminance analysis of the image data, and the dimming control of the backlight is performed based on the calculated dimming amount. Then, the color correction is performed based on the dimming amount calculated in this manner, so that the display image data subjected to the color correction in accordance with the dimming control can be output to the display device. Further, the reverse color correction in accordance with the calculated dimming amount is performed, so that the image data after being subjected to the reverse color correction corresponding to the image data is generated, and can be compared with the image data.

Further, in the present embodiment, the dimming amount calculation circuit may calculate the dimming amount of each light source based on diffusion coefficient information of the backlight and the result of the luminance analysis.

In this manner, when the luminance unevenness is reduced by diffusing the light from the light source of the backlight, it is possible to perform the dimming control, in which the diffusion of the light of the light source is reflected, and the color correction.

Further, in the present embodiment, the circuit device may further include a distortion correction circuit configured to perform distortion correction of input image data to output the image data.

In this manner, it is possible to perform the color correction and the dimming control based on the image data after being subjected to the distortion correction by the distortion correction circuit.

The circuit device according to the present embodiment includes a distortion correction circuit configured to perform distortion correction of input image data to output image data, a color correction circuit configured to perform color correction on the image data to output display image data to a display device, and a reverse color correction circuit configured to perform reverse color correction of the color correction on the display image data to output image data after being subjected to the reverse color correction. The circuit device further includes a reverse distortion correction circuit configured to perform reverse distortion correction of the distortion correction on the image data after being subjected to the reverse color correction to output image data after being subjected to the reverse distortion correction, and a comparison circuit configured to compare the input image data with the image data after being subjected to the reverse distortion correction to output a result of the comparison as error detection information of the display image data.

In this manner, the comparison circuit can detect not only whether the color correction is appropriately performed by the color correction circuit but also whether the distortion correction is appropriately performed by the distortion correction circuit, thereby improving the reliability of the circuit device, or the like.

In the present embodiment, the display device may include a display panel and a backlight including a plurality of light sources, the light sources of the plurality of light sources may be provided corresponding to respective areas of a plurality of areas of the display panel, and the circuit device may include a luminance analysis circuit configured to perform luminance analysis of the image data, and a dimming amount calculation circuit configured to calculate a dimming amount of each light source based on a result of the luminance analysis. Then, the color correction circuit may perform the color correction based on a calculation result of the dimming amount, and the reverse color correction circuit may perform the reverse color correction based on the calculation result of the dimming amount.

In this manner, by comparing the image data with the image data after being subjected to the reverse color correction, it is possible to check whether the color correction and the dimming control of each light source of the backlight are correctly performed.

In the present embodiment, the circuit device may further include a line buffer configured to temporarily store the image data, and the color correction circuit may perform the color correction on the image data temporarily stored in the line buffer.

In this manner, after the luminance analysis and the calculation process of the dimming amount are completed, the display image data subjected to the color correction based on the calculation result of the dimming amount is output to the display device, and the dimming control based on the calculation result of the dimming amount can be performed.

In the present embodiment, the dimming amount calculation circuit may calculate the dimming amount based on detection information from an illuminance sensor that detects external light, and the reverse color correction circuit may perform the reverse color correction based on the detection information.

In this manner, it is possible to perform the dimming control based on the dimming amount calculated based on the detection information of the illuminance sensor. Then, when the dimming control reflecting the detection information of the illuminance sensor is performed and the color correction in accordance with the dimming control is performed, the reverse color correction is performed based on the detection information from the illuminance sensor, so that the image data after being subjected to the reverse color correction corresponding to the image data can be appropriately generated.

The display system according to the present embodiment includes the circuit device described above and the display device.

Although the present embodiment is described in detail as described above, it will be readily apparent to those skilled in the art that many modifications may be made without departing substantially from novel matters and effects of the present disclosure. Therefore, all such modifications are intended to be included within the scope of the present disclosure. For example, a term described at least once together with a different term having a broader meaning or the same meaning in the description or the drawings can be replaced with the different term in any place in the description or the drawings. In addition, all combinations of the present embodiment and the modifications are also included in the scope of the present disclosure. Further, configurations, operations, and the like of the circuit device, the display device, the display system, the head-up display, and the like are not limited to those described in the present embodiment, and various modifications can be made.

What is claimed is:

1. A circuit device comprising:

a color correction circuit configured to perform color correction conversion on image data to output display image data to a display device;

a reverse color correction circuit configured to perform reverse color correction of the color correction conversion on the display image data to output reversed image data, the reverse color correction being reverse conversion of the color correction conversion; and a comparison circuit configured to compare the image data with the reversed image data to output a result of the comparison as error detection information of the display image data.

2. The circuit device according to claim 1, wherein the color correction circuit is configured to perform the color correction conversion on the image data in accordance with a luminance of a light source of the display device that displays an image using the light source and the display image data, and the reverse color correction circuit is configured to perform the reverse color correction on the display image data in accordance with the luminance of the light source.

3. The circuit device according to claim 1, wherein the display device includes a display panel and a backlight including a plurality of light sources, the plurality of light sources are provided corresponding to respective areas of a plurality of areas of the display panel, the color correction circuit is configured to perform the color correction conversion on the image data in accordance with luminance of each of the plurality of light sources, and the reverse color correction circuit is configured to perform the reverse color correction on the display image data in accordance with the luminance of each of the plurality of light sources.

4. The circuit device according to claim 3, further comprising:

a luminance analysis circuit configured to perform luminance analysis of the image data; and a dimming amount calculation circuit configured to calculate a dimming amount of each of the plurality of light sources based on a result of the luminance analysis, wherein the color correction circuit is configured to perform the color correction conversion based on a calculation result of the dimming amount, and the reverse color correction circuit is configured to perform the reverse color correction based on the calculation result of the dimming amount.

5. The circuit device according to claim 4, wherein the dimming amount calculation circuit is configured to calculate the dimming amount of each of the plurality of light sources based on diffusion coefficient information of the backlight and the result of the luminance analysis.

6. The circuit device according to claim 1, further comprising:

a distortion correction circuit configured to perform distortion correction of input image data to output the image data.

7. A circuit device comprising:

a distortion correction circuit configured to perform distortion correction of input image data to output image data;

a color correction circuit configured to perform color correction on the image data to output display image data to a display device;

a reverse color correction circuit configured to perform reverse color correction of the color correction on the display image data to output image data after being subjected to the reverse color correction;

a reverse distortion correction circuit configured to perform reverse distortion correction of the distortion correction on the image data after being subjected to the reverse color correction to output image data after being subjected to the reverse distortion correction; and a comparison circuit configured to compare the input image data with the image data after being subjected to the reverse distortion correction to output a result of the comparison as error detection information of the display image data.

8. The circuit device according to claim 7, wherein the display device includes a display panel and a backlight including a plurality of light sources, and the plurality of light sources are provided corresponding to respective areas of a plurality of areas of the display panel, the circuit device further comprises:

a luminance analysis circuit configured to perform luminance analysis of the image data; and a dimming amount calculation circuit configured to calculate a dimming amount of each of the plurality of light sources based on a result of the luminance analysis, the color correction circuit is configured to perform the color correction based on a calculation result of the dimming amount, and the reverse color correction circuit is configured to perform the reverse color correction based on the calculation result of the dimming amount.

9. The circuit device according to claim 8, further comprising:

a line buffer configured to temporarily store the image data, wherein the color correction circuit is configured to perform the color correction on the image data temporarily stored in the line buffer.

10. The circuit device according to claim 4, wherein the dimming amount calculation circuit is configured to calculate the dimming amount based on detection information from an illuminance sensor that is configured to detect external light, and the reverse color correction circuit performs the reverse color correction based on the detection information.

11. A display system comprising:

the circuit device according to claim 1; and the display device.

* * * * *